United States Patent [19]

Hugh

[11] 3,964,149

[45] June 22, 1976

[54] REVERSIBLE PULLER

[75] Inventor: Melvin D. Hugh, Wilmington, Calif.

[73] Assignee: Ingersoll-Rand Company, Woodcliff Lake, N.J.

[22] Filed: May 5, 1975

[21] Appl. No.: 574,387

[52] U.S. Cl. .................................................. 29/261
[51] Int. Cl.² .......................................... B23P 19/04
[58] Field of Search .............. 29/258, 259, 260, 261

[56] References Cited

UNITED STATES PATENTS

| | | | |
|---|---|---|---|
| 1,064,400 | 6/1913 | Timmins | 29/259 |
| 1,447,768 | 3/1923 | Dover et al. | 29/261 |

FOREIGN PATENTS OR APPLICATIONS

| | | | |
|---|---|---|---|
| 1,111,638 | 11/1955 | France | 29/261 |

*Primary Examiner*—James L. Jones, Jr.
*Attorney, Agent, or Firm*—Walter C. Vliet

[57] ABSTRACT

This invention relates to devices for removing gears, bearings, sleeves, and the like, from a shaft or cylinder. The invention relates to an improved device for this purpose that combines a reversible gear and sleeve puller in one tool. The jaws of the device are fully adjustable and secured relative to the work piece.

5 Claims, 5 Drawing Figures

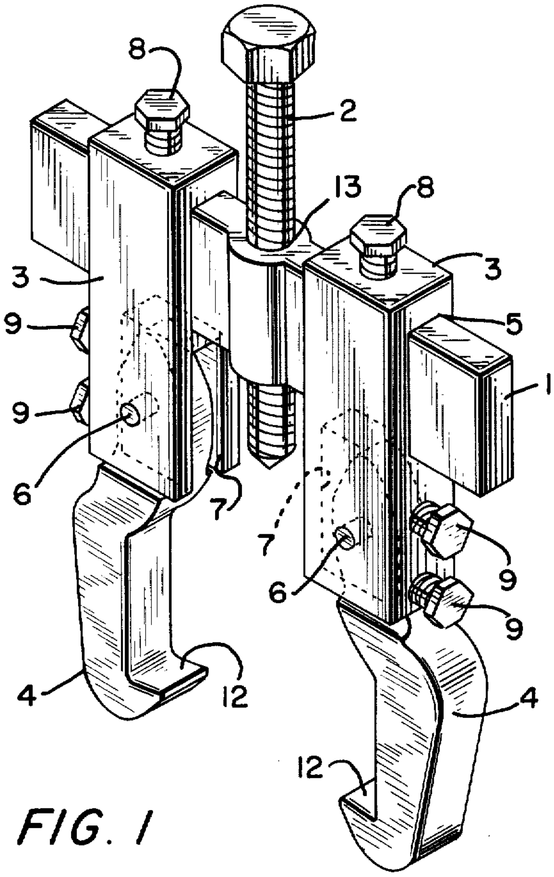
FIG. 1
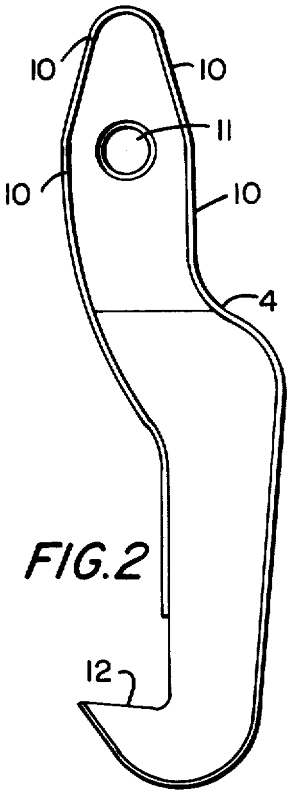
FIG. 2
FIG. 3
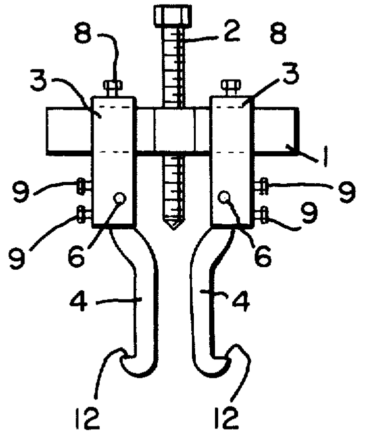
FIG. 4
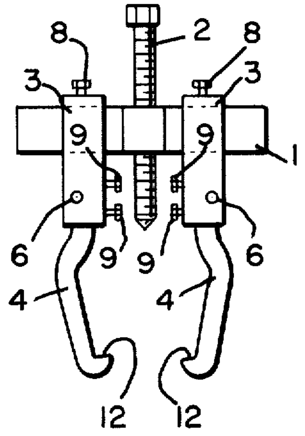
FIG. 5
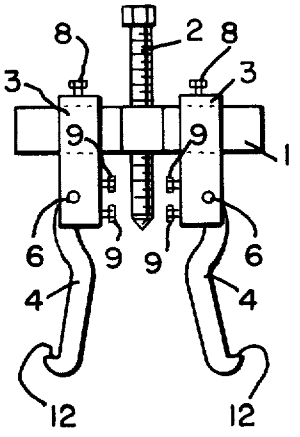

REVERSIBLE PULLER

BACKGROUND OF THE INVENTION

Several attempts have been made to provide a pulling device suitable for both external gears and internal sleeves. These devices have been provided in many cases with a means for forcing the jaws into contact with the working surface. Often a spring loading device was utilized to retain the jaws in contact with the working surface. While this method provides for ready adjustment of the jaws relative to the work piece, the resulting pulling device is difficult to position and subject to easy slippage of the jaws from the working surface. This is not only dangerous to the operator but also often results in a damaged work piece. In other cases a screw adjustable jaw was provided to force or hold the jaws in contact with the work piece. However, the jaw was left free to rotate further into the work piece and thus precise positioning of the puller relative to the work piece was difficult to accomplish. In addition, many of the prior art pullers provided only incremental or limited cross block adjustment. In sliding pivot block pullers the purchaser had a choice of either the pivot block or gripping jaw reversal but not both.

SUMMARY OF THE INVENTION

The object of the present invention is to provide a combination inside and outside puller having fully adjustable and reversible pivot blocks and gripping jaws. It is a further object of this invention to provide a puller or pulling device having fully adjustable gripping jaws which are secured against movement in any direction relative to the pivot block. It is a further object of this invention to provide a pulling device which may be adjusted for a specific application and repeatedly used without further adjustment or minimal amount of adjustment and which retains its preset alignment with each use. In general, the object of this invention is to obtain a gear pulling device comprising: a cross block; a forcing screw threadably engaged in the cross block for relative perpendicular movement thereto; a plurality of pivot blocks disposed on the cross block for relative longitudinal movement thereto; a gripping jaw pivotably mounted on each of the pivot blocks and means to adjustably secure the gripping jaw from pivotal rotation in both the clockwise and counterclockwise directions.

BRIEF DESCRIPTION OF THE DRAWINGS

FIG. 1 is a perspective view of the pulling device of this invention showing the pivot block with the jaw adjustment screws to the outside and the gripping jaws to the inside for external pulling use.

FIG. 2 is an elevation view of the gripping jaws of the pulling device.

FIG. 3 is an elevation view of the gear pulling device of this invention with the cross block positioned with the adjusting screws to the outside and the gripping jaws positioned to the outside for the purpose of inside pulling.

FIG. 4 is an elevation view of this invention with the pivot block positioned with the adjusting screws to the inside and the gripping jaws positioned to the inside for outside pulling.

FIG. 5 is an elevation view of this invention with the pivot blocks positioned with the adjusting screws positioned to the inside and the gripping jaws positioned to the outside for inside pulling.

DESCRIPTION OF THE PREFERRED EMBODIMENT

FIG. 1 shows the pulling device of this invention. Major components of the puller are the cross block 1 which has a generally rectangular cross section and which is provided with a threaded bore 13. A forcing screw 2 is disposed in a threaded bore 13 at right angles to the longitudinal axis of the cross block. The pivot blocks 3 are provided with in a generally rectangular bore 5 for disposal with a sliding clearance on cross block 1. The pivot blocks 3 are provided with a locking screw 8 for securing the pivot block from translation along the longitudinal axis of the cross block. The pivot blocks 3 are provided with a mortise 7 for the purposes of receiving the gripping jaws 4. The gripping jaws 4 are secured in the mortise 7 by means of the pivot pins 6. The pivot blocks 3 are also provided with a pair of positioning screws 9 which contact bearing surfaces 10 of the gripping jaws 4 (Shown on FIG. 2.) The positioning screws 9 cooperate to position gripping jaws 4 with respect to rotation about pivot pins 6 when both are adjusted in contact with the bearing surfaces 10. The gripping jaws 4 are provided with a pivot pin bore 11 (Shown on FIG. 2) for the purpose of receiving the pivot pins which mount the gripping jaws within the mortise 7 of the pivot blocks 3. The gripping jaws are provided with a work engaging surface 12 which is generally perpendicular to the longitudinal axis of the jaws although a slight incline of from 3° to 7° as shown on FIG. 2 is desirable. The materials and components are designed to withstand the pulling forces generated by force screw 2. In operation all of the positioning screws 9 are backed out to allow free rotation of the gripping jaws 4 within the pivot blocks 3. The locking screws 8 are backed out to allow free sliding of the pivot blocks 3 along the longitudinal axis of the cross block 1. The rotation of the pivot blocks about cross block 1 is prevented by the rectangular cross section of the cross block 1 and the rectangular bore 5 of the pivot blocks 3. Forcing screw 2 is backed out to clear the shaft or bottom of the cylinder as the case may be. The operator then determines which of the 4 positions as shown in FIGS. 1, 3, 4, and 5 is required. The pivot blocks 3 may be removed from the cross block 1 and reversed if required and/or pivot pin 6 may be removed and the gripping jaws reversed as required. Having selected the appropriate pulling configuration, the operator next places the pulling device in the appropriate position for an alignment of the forcing screw axis with the axis of the shaft or cylinder from which the gear or sleeve or other similar device is to be removed. The operator next proceeds to adjust the relative jaw angle desired by means of the position screws 9 and the desired radial extention of the pivot blocks relative to the forcing screws by means of locking screw 8. Once these adjustments have been made and both the position screw 9 and locking screw 8 have been snugged in and the gripping jaws positioned for proper working contact with the part to be removed, the forcing screw is then rotated to advance in the direction of the work piece. The force generated by the contact of the forcing screw on the shaft or the bottom of the cylinder as the case may be is transmitted via the cross block to the pivot block and the gripping jaws and ultimately to the part to be removed. In this manner the part to be removed is lifted from the shaft or the cylinder. The removal of the pulling device is accomplished simply by releasing one of the locking screws 8 and allowing the pivot blocks 3 to move in the appropriate direction for removal. Upon repeated application, it is merely necessary to back out the forcing screw and position the pulling device and return the sliding pivot block to the original position and reset the locking screw. It should be obvious to one skilled in the art that the pulling device offers the advantage of precise jaw positioning, and upon repeated application for the same or similar pulling application, rapid and repeated pulling results. Although the preferred embodiment of the invention shows a two arm cross block, it should be obvious to one skilled in the art that the invention is applicable to three or more arm cross blocks as well. The forcing screw may be threaded in the cross block as shown or a separate and replaceable forcing nut with optional thrust washer or bearing may be utilized. Where a forcing nut is utilized, the cross block would have a threadless center hole. The preferred embodiment is shown for use with a forcing screw. However, the forcing screw may be replaced by a slide hammer with very favorable results. It should be obvious to one skilled in the art that the multiple configuration with accurate and secure positioning of the gripping jaws is a desirable feature for slide hammer use. It should be further understood that the invention is not limited thereto except by the scope of the claims. Various modifications can be made without departing from the scope and spirit of the invention as the same will now be understood by those skilled in the art.

I claim:

1. A pulling device comprising:

a cross block;

a forcing screw threadably engaged in said cross block for relative perpendicular movement thereto;

a plurality of pivot blocks disposed on said cross block for relative longitudinal movement thereto;

a gripping jaw having a work engaging surface on one side of said jaw pivotally mounted on each of said pivot blocks;

means to adjustable secure said gripping jaw from pivotal rotation in both the clockwise and counterclockwise directions;

said pivot blocks are reversible on said cross block and said gripping jaws are reversible in said pivot block;

said gripping jaws have bearing surfaces on both sides of the jaw about the pivot for engagement with said means to adjustably secure said gripping jaw from rotation about its pivot to allow for reversal of said gripping jaw and its secure adjustment in both reversible positions; and said means to adjustably secure said gripping jaw is two positioning screws and wherein one of said positioning screws secures said gripping jaw against rotation about its pivot in a clockwise direction and the other of said positioning screws secures said gripping jaws against rotation about its pivot in a counterclockwise direction.

2. The pulling device of claim 1 wherein:

said cross block is substantially of rectangular cross section; and said pivot blocks have a matching bore of rectangular cross section for mounting on said cross block and allowing said pivot blocks to slide longitudinally on said cross block while preventing both perpendicular translation and pivotal rotation about the longitudinal axis of said cross block.

3. The pulling device of claim 2 wherein:

said pivot blocks are adjustably secured against longitudinal translation by means of a locking screw.

4. The pulling device of claim 1 wherein:

said gripping jaws have a work engaging surface generally perpendicular to the longitudinal axis of said jaws and positioning surfaces generally parallel to the longitudinal axis of said jaws for engagement with said means to adjustably secure said gripping jaw.

5. The pulling device of claim 4 wherein:

the work engaging surface of said gripping jaws is at an angle of 3° to 7° from the perpendicular to the longitudinal axis of said jaw.

* * * * *